United States Patent [19]
Derbyshire

[11] 3,881,838
[45] May 6, 1975

[54] DRILL ATTACHMENT
[75] Inventor: George C. Derbyshire, Sheffield, England
[73] Assignee: The Jacobs Manufacturing Company, Limited, Sheffield, England
[22] Filed: Oct. 25, 1973
[21] Appl. No.: 409,578

[52] U.S. Cl. ............ 408/67; 408/241 G; 145/116 A
[51] Int. Cl. .............................................. B23b 45/00
[58] Field of Search ................ 408/67, 72 R, 241 G; 144/252; 175/211; 51/270; 145/116 A

[56] References Cited
UNITED STATES PATENTS
| | | | |
|---|---|---|---|
| 881,856 | 3/1908 | Hagstrom et al. | 145/116 A |
| 3,339,435 | 9/1967 | Heitz | 408/67 |
| 3,583,821 | 6/1971 | Shaub | 408/72 |

FOREIGN PATENTS OR APPLICATIONS
| | | | |
|---|---|---|---|
| 653,033 | 9/1964 | Belgium | 175/211 |

Primary Examiner—Gil Weidenfeld
Attorney, Agent, or Firm—Stephen J. Rudy

[57] ABSTRACT

An attachment to be fitted to a drill bit for preventing during overhead drilling falling dust from droopping into the chuck or upon the operator, comprising an annular disc having a central hole through which the drill passes and provided with a flexible support which grips the shank of the bit.

4 Claims, 3 Drawing Figures

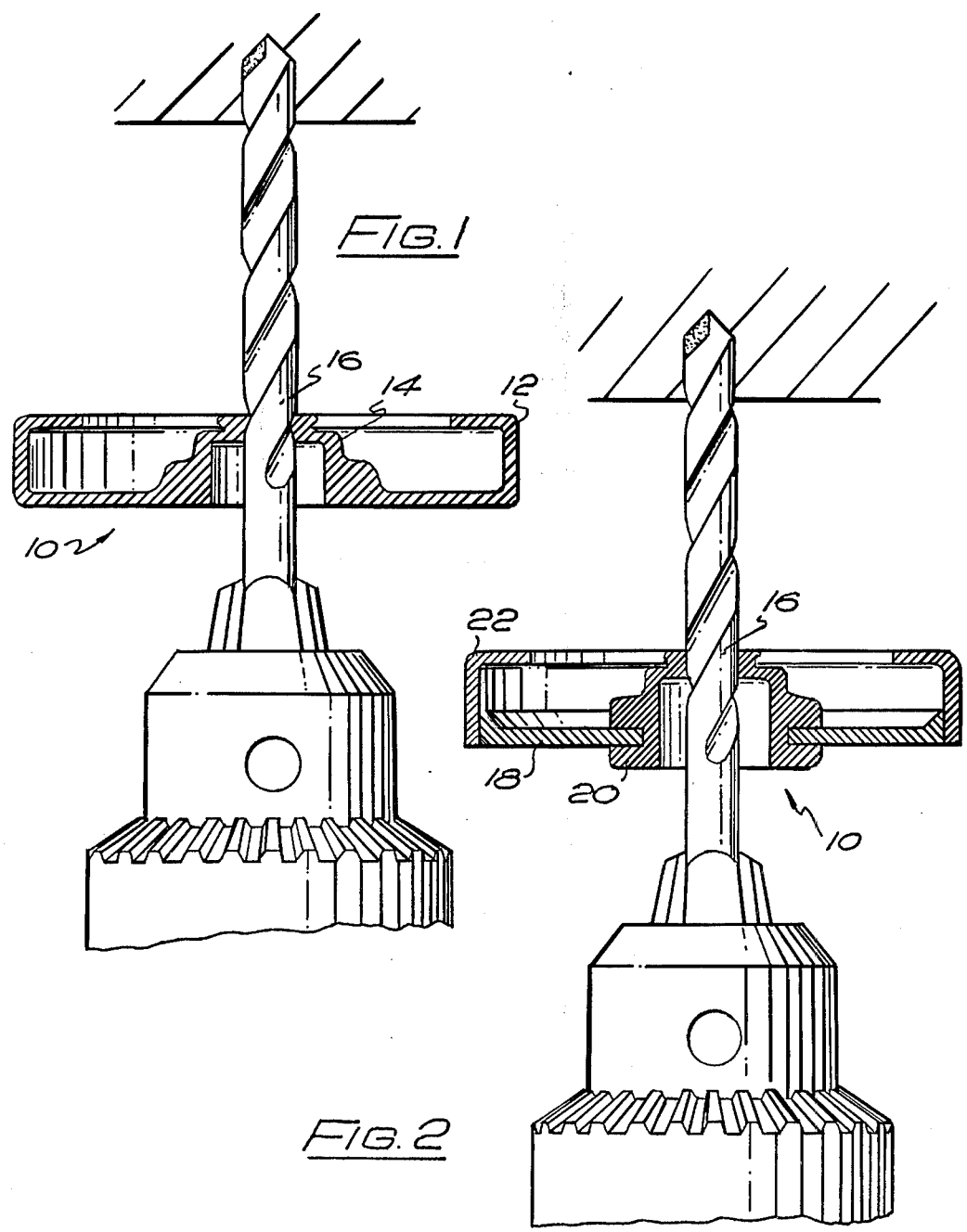

3,881,838

DRILL ATTACHMENT

BACKGROUND OF THE INVENTION

The invention relates to drilling attachments and has for its object to provide an improvement therein.

It is a particular problem when drilling into a ceiling or other overhead location that there is a tendency for the dust or swarf to fall into the drill chuck so that, combining with lubricant on the moving parts of the chuck, it forms a highly abrasive paste which over a period of time is liable to cause excessive wear and possibly even jamming of the chuck. Such falling dust and swarf is also liable to fall onto the clothes of the user of the drill, and there is a danger that it may fall into his eyes. The present invention aims to at least alleviate this problem.

According to the invention, there is provided an attachment or device designed to be fitted to a drill bit, the attachment having an annular disc with a central hole through which the drill bit is to extend. The annular disc may be either flat or dished but in either case will preferably be provided with an undercut circumferential lip beneath which dust and swarf falling onto the attachment will be swept by centrifugal force as drilling in an overhead location proceeds. The central hole will preferably extend through a flexible support, such as a boss or bush element made of rubber or the like so as to accommodate a range of drill bit sizes. The attachment may be of one piece molded form. On the other hand, it may be of composite construction in which case it may comprise the annular disc, a central supporting boss or bush, and a circumferential undercut rim member.

In order that the invention may be fully understood and readily carried into effect, the same will now be described, by way of example only, with reference to the accompanying drawings.

BRIEF DESCRIPTION OF THE DRAWING

In the accompanying drawing:

FIG. 1 is an axial section through one form of attachment embodying the invention;

FIG. 2 is a view similar to FIG. 1 of another form of such attachment; and

DETAILED DESCRIPTION

Figure 3:
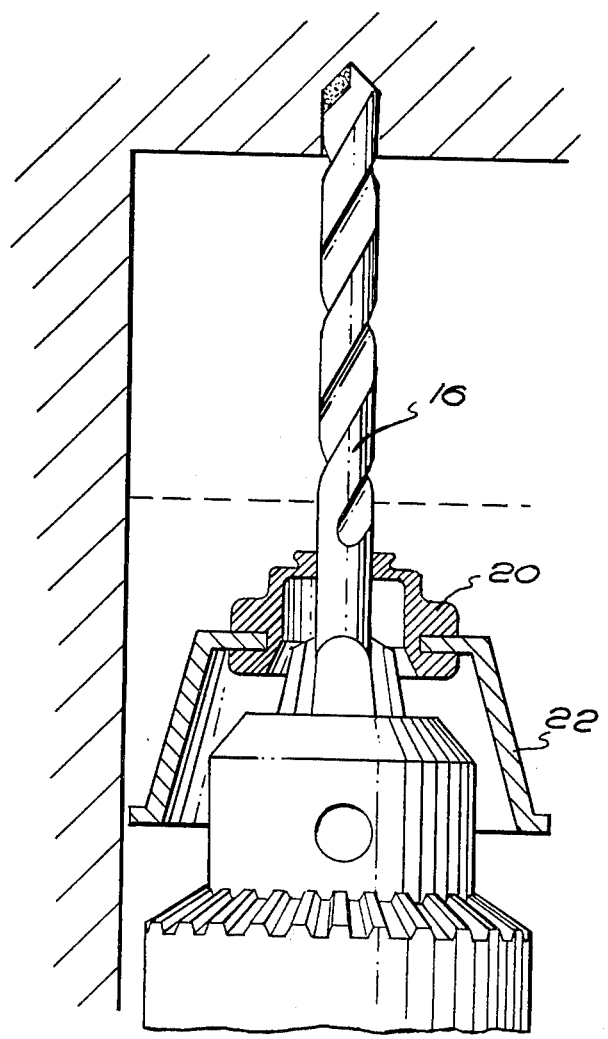
FIG. 3 is an axial section through yet another form of attachment embodying the invention.

Referring now to FIG. 1 of the drawing, an attachment generally indicated 10 to be fitted to a drill bit (as shown) is of one-piece molded rubber construction and has the form of a flat circular container with an undercut circumferential lip 12. At its center, the attachment has a flexible boss 14 through which a central hole 16 extends, the arrangement being such that the attachment can be fitted to any one of a range of drill bits, the flexible boss expanding to accommodate the drill bit and gripping the latter resiliently.

In use (as shown), when drilling in an overhead location, dust or swarf which falls onto the attachment is swept by centrifugal force beneath the undercut circumferential lip 12. Consequently, it cannot fall into the drill chuck or onto the user and when the hole has been drilled (or when a number of holes have been drilled and before the attachment has become full of dust and swarf), the collection of dust or swarf in the attachment can be emptied.

Referring now to FIG. 2, in another form of the invention, the attachment 10 is of composite construction and comprises a flat annular disc 18 made of a synthetic plastics material, a central support such as a boss bush 20 made of rubber, and a circumferential undercut rim member 22 also made of a synthetic plastics material. The rim member 22 is a snap fit on the disc 18 and the support bush 20 is engaged in the central aperture of the annular disc as shown. The support bush has central hole 16 for the reception of a drill bit. The attachment is, of course, used in exactly the same way as the attachment of one-piece construction originally described except that if desired the rim member 22 can be detached from the annular disc for cleaning out the dust and swarf.

In FIG. 3, there is shown yet another form of the invention, but in this case the attachment includes but a dished annular disc 22 and the central support bush 20. It will be understood that in this case the attachment serves only to exclude dust and swarf from the drill chuck and to protect the chuck against damage when used in a location where there is only limited access.

Various modifications may be made without departing from the scope of the invention. For example, in the case of the attachments illustrated in FIGS. 2 and 3, a plurality of support bushes 20 may be provided having different sized holes 16, the correct bush being selected to be fitted in the attachments according to the size of drill bit which is to be used. Furthermore, it would not be outside the scope of the invention for any of the attachments illustrated to be provided with location means for locating it firmly on the drill chuck, although it would, of course, still require a resilient sleeve portion arranged to closely embrace the drill bit being used. The attachment illustrated in FIG. 2 could, of course, be used when drilling in horizontal and other positions to deflect steel swarf and the like from the user. When used in this way, the attachment could have its rim member 22 removed. An attachment embodying the invention may be made of one of a number of materials.

What is claimed is:

1. A device removably attachable to the shank of a drill bit carried by a chuck of a rotary tool and serving to catch and thereby guard against dust and swarf falling upon the chuck or upon the operator when using the tool in an overhead drilling operation, the device comprising a circular container having a bottom wall, a side wall, a circumferential lip offset radially inward from the top end of the side wall forming a cavern with said bottom and side walls to receive and retain said dust and swarf being swept therein by centrifugal force during said overhead drilling operation and said lip defining an opening in the top end of the container for receiving said dust and swarf, and a bush of flexible resilient material forming a portion of the bottom wall and extending upwardly in the container, the bush having an axially extending hole therethrough of slightly less diameter than the shank of the drill bit with which the device is to be used enabling fitting of the bush upon the shank of the drill bit in gripping relation to the latter, the opening in the top of the container being of a greater diameter than the outer diameter of the bush, and the axial dimension of the container being substantially less than the extent of axial projection of the shank of the drill bit from the chuck.

2. A device as in claim 1, wherein the outer diameter of the side wall of the container is greater than that of the chuck of the tool with which the device is used.

3. A device as in claim 2, wherein the outer diameter of the bush progressively decreases in an upward direction.

4. A device as in claim 1, wherein the bush is replaceable with a bush having an axially extending hole of a different diameter.

* * * * *